(Model.) 2 Sheets—Sheet 1.
S. H. CLARK & J. G. PARSONS.
FIFTH WHEEL.
No. 280,350. Patented July 3, 1883.
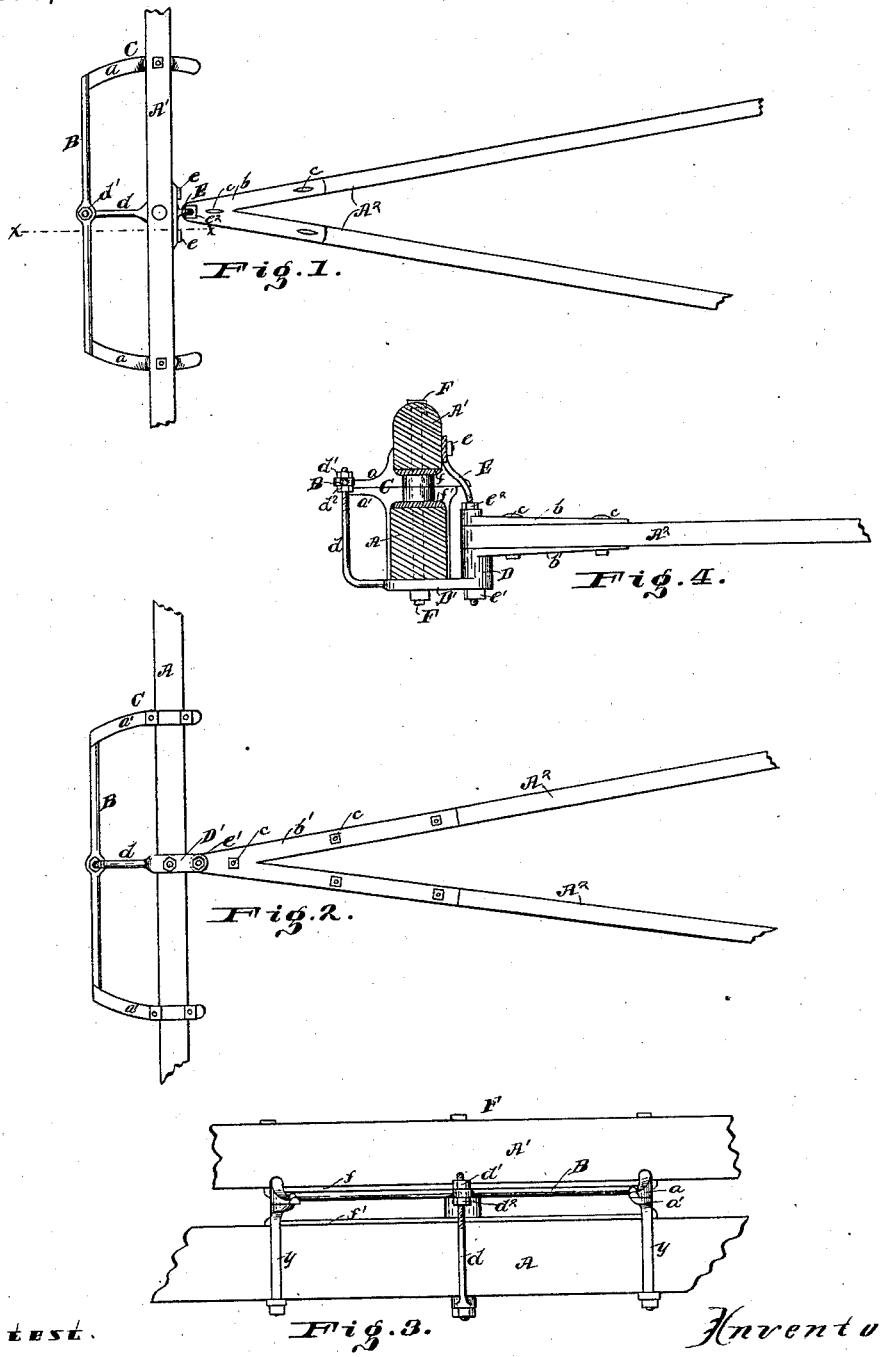
Attest.
E. R. Hill
N. P. Gulick
Inventors.
Samuel H. Clark,
and
John G. Parsons,
per Wm. Hubbell Fisher
Atty (Model.) 2 Sheets—Sheet 2.

S. H. CLARK & J. G. PARSONS.
FIFTH WHEEL.

No. 280,350. Patented July 3, 1883.

Attest:
E. R. Hill
N. P. Gurick

Inventors.
Samuel H. Clark
and
John G. Parsons,
per Wm. Hubbell Fisher,
Atty

UNITED STATES PATENT OFFICE.

SAMUEL H. CLARK, OF CINCINNATI, OHIO, AND JOHN G. PARSONS, OF OSHKOSH, WISCONSIN.

FIFTH-WHEEL.

SPECIFICATION forming part of Letters Patent No. 280,350, dated July 3, 1883.

Application filed December 2, 1882. (Model.)

*To all whom it may concern:*

Be it known that we, SAMUEL H. CLARK, a resident of the city of Cincinnati, in the county of Hamilton and State of Ohio, and JOHN G. PARSONS, of Oshkosh, in the county of Winnebago and State of Wisconsin, have invented certain new and useful Improvements in Vehicle-Couplings, of which the following is a specification.

Our invention relates to the coupling between the perch and the front axle and head-block or bolster; and one of its principal objects is to provide an adjustable connection which shall allow the perch and the bolster or head-block, the front axle, and the upper and lower faces of the fifth-wheel, or of the latter's equivalent, to be readily adjusted in relation to each other in such a manner that the faces of the upper and lower halves of the fifth-wheel shall work evenly against each other, and without friction. This adjustable feature also enables us to compensate for any wear of the fifth-wheel, and this compensation can be readily made, whenever needed, at any time during the life of the vehicle.

Another principal feature of our invention consists in a novel construction, as hereinafter described, of the connections between the perch and the front axle and bolster or head-block, and a fifth-wheel of a certain formation, whereby the vehicle-body may be hung as low as desired, and yet remain out of contact with the perch and fifth-wheel.

Our invention is applicable to either single or double perch vehicles; but in the present instance we have illustrated it as applied to a double-perch gear.

Figure 5:
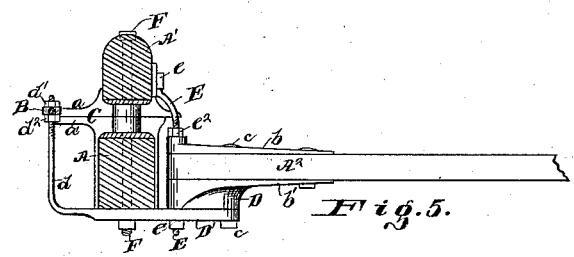
Figure 6:
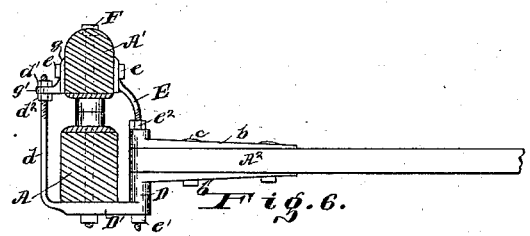
Figure 7:
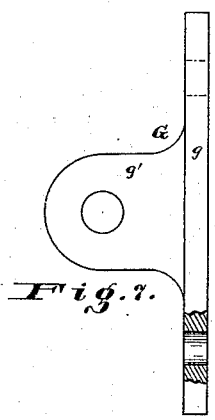
Figure 8:
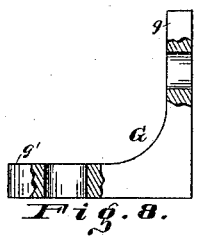
Figure 9:
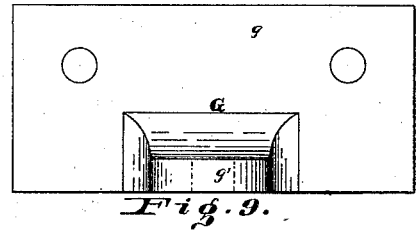
Figure 10:
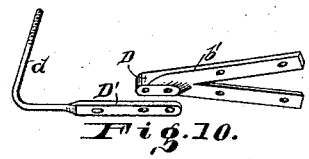

Referring to the drawings forming part of this specification, Figure 1 is a top view of our invention, showing its preferable form. Fig. 2 is a bottom view of the same. Fig. 3 is an enlarged front view. Fig. 4 is an enlarged sectional view, the section being taken at the line $xx$ of Fig. 1, and looking toward that side which is at the top in said figure. Figs. 5 and 6 are sectional views, representing modifications of our invention. Figs. 7, 8, and 9, represent the connecting-plate employed in Fig. 6, Fig. 7 being a top view, Fig. 8 an end view, and Fig. 9 a front view thereof. In Figs. 7 and 8 a portion of the plate is broken away to show certain bolt-holes therein. Fig. 10 is a perspective view, representing the lower plates employed in the device shown in Fig. 5.

A is the front axle, A' the head-block or bolster, and $A^2$ the perch, which in the present instance is double.

Attached to the axle and bolster is the usual fifth-wheel, C, consisting of the upper half, $a$, connected to the bolster, and the lower half, $a'$, connected to the axle in any preferred manner, and here shown connected to the axle by appropriate clips, $y$. The front ends of the upper half, $a$, of the fifth-wheel are connected by a rod, B.

The front end of the perch $A^2$ is dropped below the bolster to a level with the axle, as shown; and the two branches of the double perch unite just behind the axle, and are secured together by means of two V-shaped perch-irons, $b\ b'$, one above and the other below the perch, the branches of said irons extending out on the branches of the perch, and suitably secured thereto. The lower perch-iron, $b'$, preferably extends under the axle in one piece, as shown in Figs. 4 and 6. The iron $b'$ is, when the perch is located at the precise elevation in relation to the axle as shown in the drawings, preferably thickened at the end of the perch, as shown at D; and from this point the plate or bar D' extends under and beyond the front of the axle, and is afterward bent up in front of the latter to form a brace and adjustment rod, $d$, the end of which passes through the connecting-bar B, or an extension thereof, and a nut, $d'$, is screwed thereon, another set-nut, $d^2$, being screwed on the rod $d$ below the connecting-bar or extension thereof. Just behind the bolster and front axle is another brace and adjustment bolt, E, the upper end of which is preferably T-shaped or flattened, and is secured to the rear face of the bolster A' by suitable bolts, $e$, or equivalent fastening devices; and this bolt or rod E passes through the end of the upper perch-iron, $b$, through the end of the perch, and through the thickened portion D of the lower perch-iron, $b'$, the lower end of said rod being provided with a nut, $e'$, and the portion of the rod E which is at and near to the upper perch-iron is screw-threaded, and a nut, $e^2$, working on this last-named screw-threaded portion of said rod, is screwed down against the perch-iron $b$, to act as a set-nut. The bolster is provided with the usual king-bolt bearing or plate, $f$, and the axle with the usual corresponding bearing or plate, $f'$, through which and the bolster and axle passes the king-bolt F, securing the axle to the bolster.

While we prefer to form the lower perch-iron, $b'$, and the plate or bar D', and rod $d$ in one piece, they may, if desired, be formed separately, and preferably as shown in Figs. 5 and 10, the perch-iron being in one piece, and the bar D' and rod $d$ in another piece, in which event the thickened portion D of the lower perch-iron will be preferably extended, as shown, and the end of the bar D' also extended, so that not only the bolt E but also one of the bolts $e$ may pass through this thickened portion and through the bar D', thus securing them firmly together. The mode of connecting the bar D' to the lower perch-plate and to the portion D thereof, when present, is to be varied, as found expedient. Otherwise the construction and operation of the devices shown in Fig. 5 are like those of the devices shown in Fig. 4.

Another slight modification in construction is that shown in Fig. 6, the principle and operation of which are, however, identical with those of the devices shown in Fig. 4. In this last-mentioned modification the cross-rod B, which connects the front ends of the fifth-wheel, is dispensed with, and the rod $d$ is connected to the bolster through the medium of a plate or bracket-iron, G, instead of through the medium of the cross-bar B and fifth-wheel. This bracket G preferably consists of a vertical plate, $g$, which rests against the front face of the bolster, and a horizontal plate or lug, $g'$, through which the end of the rod $d$ passes, and to which it is secured in the same manner as before described for securing it to the connecting-rod B—viz., by the nuts $d'$ and $d^2$. This angle-iron G is secured to the front of the bolster by suitable means, preferably by the same bolts, $e$, by which the flattened head of the bolt E is secured to the rear face of the bolster, as shown in Fig. 6.

Heretofore, in ironing the vehicle-gear having a rigid frame, it has been necessary, in order to insure an accurate adaptation of the upper and lower halves of the fifth-wheel, to connect the upper half to the bolster and the lower half to the axle, and then try them together, and if they did not fit to take them apart again, and, by hammering, changing the bolts, or otherwise rebending or reshaping one or more of the parts, adapt one half of the fifth-wheel to fit and work evenly against the other. Hitherto it has been a difficult matter to secure a perfect adaptation of the two halves of the fifth-wheel, and unless this adaptation is perfect the vehicle turns hard and the fifth-wheel soon wears out. Our invention obviates this difficulty, as the bolster and axle may have their respective halves of the fifth-wheel secured thereto, and the two may then be put together, and if they do not fit or work accurately together, by a slight changing of the nuts $d'$ $d^2$ on the upper end of the rod $d$, and the nuts $e'$ $e^2$ on the bolt E, the bolster A' may be rotated in either direction until the meeting faces of the upper and lower halves of the fifth-wheel are accurately adapted to each other, and firmly secured in this position by the set-nuts. This construction and arrangement, as will be readily seen, enables us to compensate for any wear of the fifth-wheel, and thereby at all times keep the coupling between the perch and bolster and the front axle snug and true, the rod $d$, bar D', bolt E, bolster A', and the connection between said bolster and the end of the rod $d$ forming an adjustable brace around the axle.

As before stated, our invention is equally applicable to single-perch vehicles, in which event the perch-irons $b$ and $b'$ will be single instead of branching or V-shaped, as shown in the drawings.

The bearings $f$ and $f'$ are preferably of a diameter such that they will wear away as fast as the halves of the fifth-wheel do, and hence will present no obstacle to the two halves of the fifth-wheel meeting and working against each other.

The upper and lower perch-irons may, when desired, be formed in one piece, and the perch or perches be suitably connected thereto, the base E not passing through the perch; or the perch-irons may be dispensed with, and the perch be suitably strengthened at the front where the brace E passes through it.

A valuable feature of our invention consists in the relative arrangement of the perch-irons, perch, and bar D', and brace $d$, whereby, as is evident from an inspection of the device, as shown, the perch can be hung low in relation to the bolster and axle, thereby enabling the body to be also hung low, and yet not come into contact with the perch. So far as this last-named feature of our invention is concerned, it can be employed where that feature of our invention which relates to the adjustment of the bolster, &c., in relation to the perch is omitted, and when, therefore, the brace $d$ is omitted.

Having thus described our invention, what we claim as new, and desire to secure by Letters Patent, is as follows:

1. A perch-coupling consisting of the perch-irons $b$ $b'$, the brace E, passing through said perch-irons and secured at the upper end to the bolster, and the rod or brace $d$, connected at its upper end to the bolster and at its lower end to the perch-iron $b'$ by means of the bar D', the brace E being provided with the nuts $e'$ $e^2$, and the rod $d$ with the nuts $d'$ $d^2$, substantially as and for the purposes specified.

2. The double perch A², the two branches being united at their front ends and supported by the branching perch-irons $b$ $b'$, in combination with the bolster $A'$ and braces or rods $d$ and $E$, said braces or rods being provided with nuts $d'$ $d^2$ and $e'$ $e^2$, substantially as and for the purposes specified.

3. The combination of the bolster $A'$, provided with the upper half, $a$, of the fifth-wheel, and the axle $A$, provided with the lower half, $a'$, of the fifth-wheel, and the perch $A^2$, perch-irons $b$ $b'$, and braces $E$ and $d$, both of said braces being connected to the bolster and to the perch, substantially as set forth, and provided with set-nuts to permit bolster to be rotated, substantially as and for the purposes specified.

4. The bolster $A'$, provided with the upper half, $a$, of the fifth-wheel, the front end of said half being connected by a rod, $B$, in combination with the perch-irons $b$ $b'$ and brace $E$, the perch-iron $b'$ being provided with extension $D'$ and brace $d$, the brace $E$ being connected to the bolster and passing through the perch-irons, and provided with the nuts $e'$ $e^2$, and the brace $d$ passing through the rod $B$, and provided with the nuts $d'$ $d^2$, substantially as and for the purposes specified.

SAMUEL H. CLARK.
JOHN G. PARSONS.

Witnesses as to Saml. H. Clark:
EDWARDS RITCHIE,
E. R. HILL.
Witnesses as to John G. Parsons:
J. H. MURIEL,
CHAS. R. NEVITT, Jr.